Figure 1:
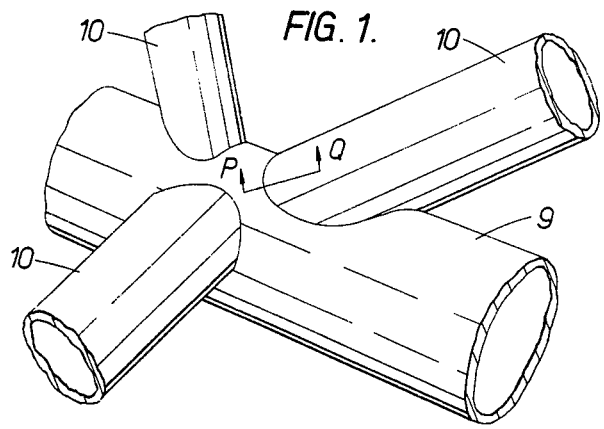

United States Patent [19]
Marshall et al.

[11] 3,936,714
[45] Feb. 3, 1976

[54] PROFILING OF METALS

[75] Inventors: Victor Gregory Marshall, Gainsborough; John Maurice Thompson, Waddingham, both of England

[73] Assignee: Redpath Dorman Long Limited, Bedford, England

[22] Filed: June 24, 1974

[21] Appl. No.: 482,657

[52] U.S. Cl. ............................. 318/576; 318/577
[51] Int. Cl.[2] ....................................... G05B 19/36
[58] Field of Search ........................... 318/576, 577

[56] References Cited
UNITED STATES PATENTS

| | | | |
|---|---|---|---|
| 2,631,028 | 3/1953 | Murr | 318/576 X |
| 2,723,845 | 11/1955 | Przybylski et al. | 318/577 X |
| 3,132,291 | 5/1964 | Neander et al. | 318/577 |
| 3,389,312 | 6/1968 | Redman | 318/577 |
| 3,567,944 | 3/1971 | Trapp | 318/577 X |
| 3,700,992 | 10/1972 | Pontigny | 318/577 X |

*Primary Examiner*—B. Dobeck
*Attorney, Agent, or Firm*—Bacon & Thomas

[57] ABSTRACT

A control arrangement for plate cutting apparatus capable of making a cut which curves in, and is angled with respect to, the local plane of a plate, which arrangement comprises a programme representation defining a curve and relating an angle to that curve, and first and second sensor devices arranged to be responsive respectively to representations of the curve and corresponding angle, and arranged to send signals capable of controlling relative movement between the plate and a cutting device, and angular movement between the line of cut and the local plane of the plate respectively, in accordance with this programme.

11 Claims, 6 Drawing Figures

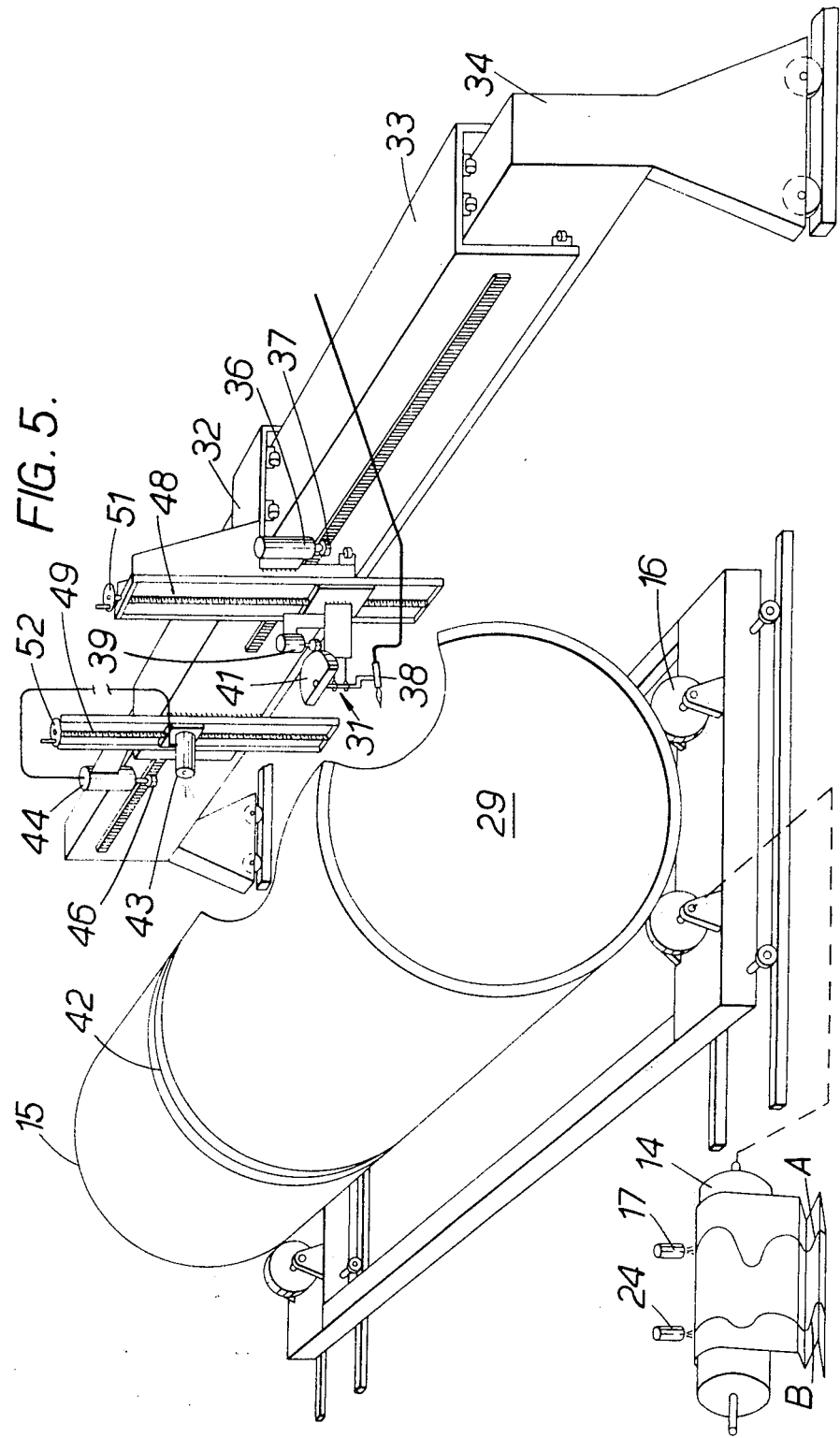

PROFILING OF METALS

The invention relates to the profiling of metals by means of a "cutting torch" and, though applicable to metals in sheet or plate form, it is particularly but not exclusively concerned with the profiling of the end faces of metal tubes of substantial diameter, e.g. as large as 60 inch diameter or more, intended to form components in welded tubular structures.

It will be understood that the expression "cutting torch" used herein is used in a generic sense and is intended to include any cutting device known in the art of profiling.

The components in welded tubular structures are often of different sizes, and may be arranged at various angles and degrees of eccentricity to each other, as well as sometimes being joined to one more additional components at a "multi-intersection" which may be known, in the art of fabricating jackets for oil production platforms, as a "node." Such variations often give rise to profiles of some complexity which is further aggravated by the need for cutting a bevel on the profiled edge, as a preparation for fusion welding. In order to provide a bevel having a constant inclination to the line of contact of the profiled edge with the surface of its mating component, a usual procedure in such structures, it is necessary to vary the angle of cut of the bevel in accordance with the variation in the angle between the meeting surfaces of the two components along the profiled edge.

Moreover, it is generally accepted that there is an optimum minium, say 40°, in the constant inclination mentioned above, so that, in the case of the inclination of one component to another being less than such optimum minimum, a bevel must be formed partly on the outer surface and partly on the inner surface on the profiled component, the run of the weld thus running from the outside to the inside of that component.

Further complexity thus arises in cutting the bevel. At the same time, it is clearly very desirable to provide for the simultaneous cutting of the profile and the cutting of the bevel on the profiled edge by one and the same cutting operation.

The required profile to be cut on the intersecting tubular component can be determined mathmatically as a function of the relative diameters of the intersecting portions of the components, the angle of intersection, the angle of bevel required, and the degree of eccentricity (if any) between axes of the two components. The surface to be cut can be represented by a 360° development of two lines, one line (the profile line) representing the contour of the edge of the bevel on the outer surface of the component i.e. the locus of the cutting point over the surface to be profiled, and the other line (the bevel line) representing the angle of cut of the bevel. Conveniently the other line may be so contoured relative to the profiled line that the lateral distance between the two lines at any point is linearlly proportional to the angle of cut of the bevel.

It is not essential that the distance between the two lines should represent the angle of cut of the bevel. The angle of cut may be represented by the distance between the bevel line and a straight datum line.

As explained above, it is necessary to vary the angle of cut of bevel as profiling proceeds, and it will be seen that such action causes a variation in the width of the "face" of the bevel along the circumference of the intersecting components, the width thus being a function of the cutting angle and the thickness of the wall of that component. The two lines mentioned above can conveniently be spaced laterally by varying amounts, between zero and maxium in either direction, corresponding to the variation in the angle of cut of the bevel, and in some cases the two lines may cross each other if plotted on the same datum.

According to the present invention, a component surface to be profiled is moved past a cutting torch so disposed in relation to the component surface that the cutting line passes transversely through the surface, the cutting point being movable bi-laterally with respect to the direction of movement of the component surface at the cutting point in response to movement of a profile scan line of predetermined contour and the axis of the cutting line being movable about an axis substantially perpendicular to the cutting line at the cutting point and extending in substantially the direction of movement of the surface at the cutting point in response to movement of a bevel scan line of predetermined contour.

The invention includes apparatus for carrying out the above profiling and bevelling operation, said apparatus comprising means for moving a component so that its surface to be profiled passes across the cutting line of a cutting torch, means for mounting the torch for movement bi-laterally with respect to the direction of movement of the component surface at the cutting point, means for rotating the torch on said mounting means independently of said bi-lateral movement about an axis substantially perpendicular to its cutting line at the cutting point and extending in substantially the direction of movement of the component surface at the cutting point, a support for profile and bevel scan lines each of predetermined contour means for moving said support across a scanning position in timed relationship with the movement of the component, means for mounting profile and bevel scanning devices for movement bilaterally with respect to the direction of movement of said support and independently movable relatively to each other so that each device is capable of independently following its scan line, and means responsive to movement of the profile and bevel scanning devices for moving the torch laterally and rotating the torch about said axis respectively.

The invention provides a control arrangement for plate cutting apparatus capable of making a cut which curves in, and is angled with respect to, the local plane of a plate, which arrangement comprises a programme representation defining a curve and relating an angle to that curve, which representation comprises two lines related to a common datum and a first sensor device operatively responsive to a representation of the curve and a second sensor device operatively responsive to a representation of the corresponding angle, said sensor devices being operatively connected to send signals respectively capable of controlling relative translational movement between the plate and a cutting device such that a constant relative speed is maintained therebetween, and angular movement between the line of cut and the local plane of the plate, in accordance with said programme representation.

The representation of the angle to the curve may be a measure of the distance between the two lines.

Preferably the sensor devices are photo electric cells having means to follow said lines by scanning action.

More particularly the invention provides a control arrangement as defined in the three preceeding paragraphs in combination with a plate cutting apparatus capable of making a cut which curves in and is angled with respect to the local plane of a plate.

Preferably the sensor devices are arranged to control servo motors which effect translational and rotational movement respectively of a cutting device relative to the plate, which is itself moved in conjunction with the programme.

It is preferred that a further sensor device is arranged to monitor translational creep of the plate, and to move the cutting apparatus accordingly.

It is further preferred that the further sensor device is a photo electric cell, and is arranged to actuate a further servo motor as it scans a reference marking on the plate.

More specifically the plate may be formed into a tubular, and may be mounted on rollers, having their axes arranged parallel with the tubular.

In this form it is further preferred that the roller and the plate cutting apparatus are relatively movable to accommodate tubulars of different sizes.

The invention also provides a method of controlling plate cutting apparatus capable of making a cut which curves in, and is angled with respect to, the local plane of a plate, which comprises the steps of taking a programme representation defining a curve and relating an angle to that curve, which representation comprises two lines related to a common datum, deriving signals from a first sensor device operatively responsive to a representation of the curve and a second sensor device operatively responsive to a representation of the corresponding angle, and using those signals respectively to control relative translational movement between the plate and a cutting device such that a constant relative speed is maintained therebetween, and angular movement between the line of cut and the local plane of the plate in accordance with said programme representation.

Figure 2B:
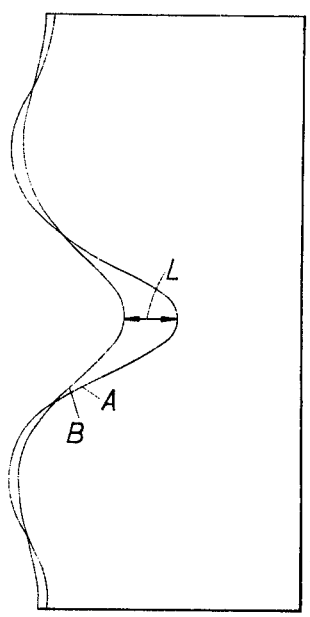
Figure 2A:
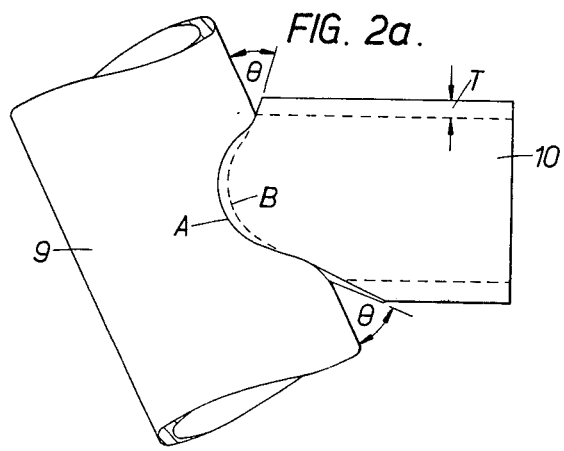
Figure 3:
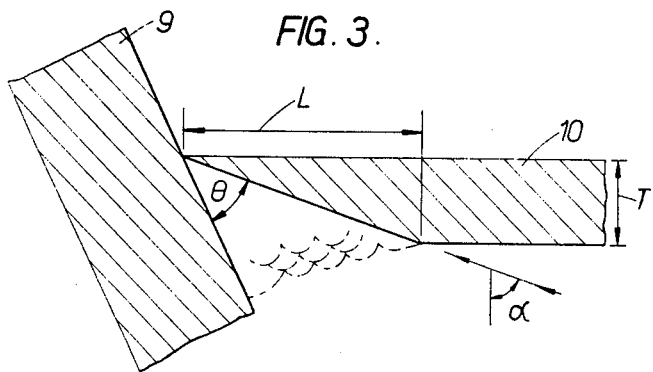
Figure 4:
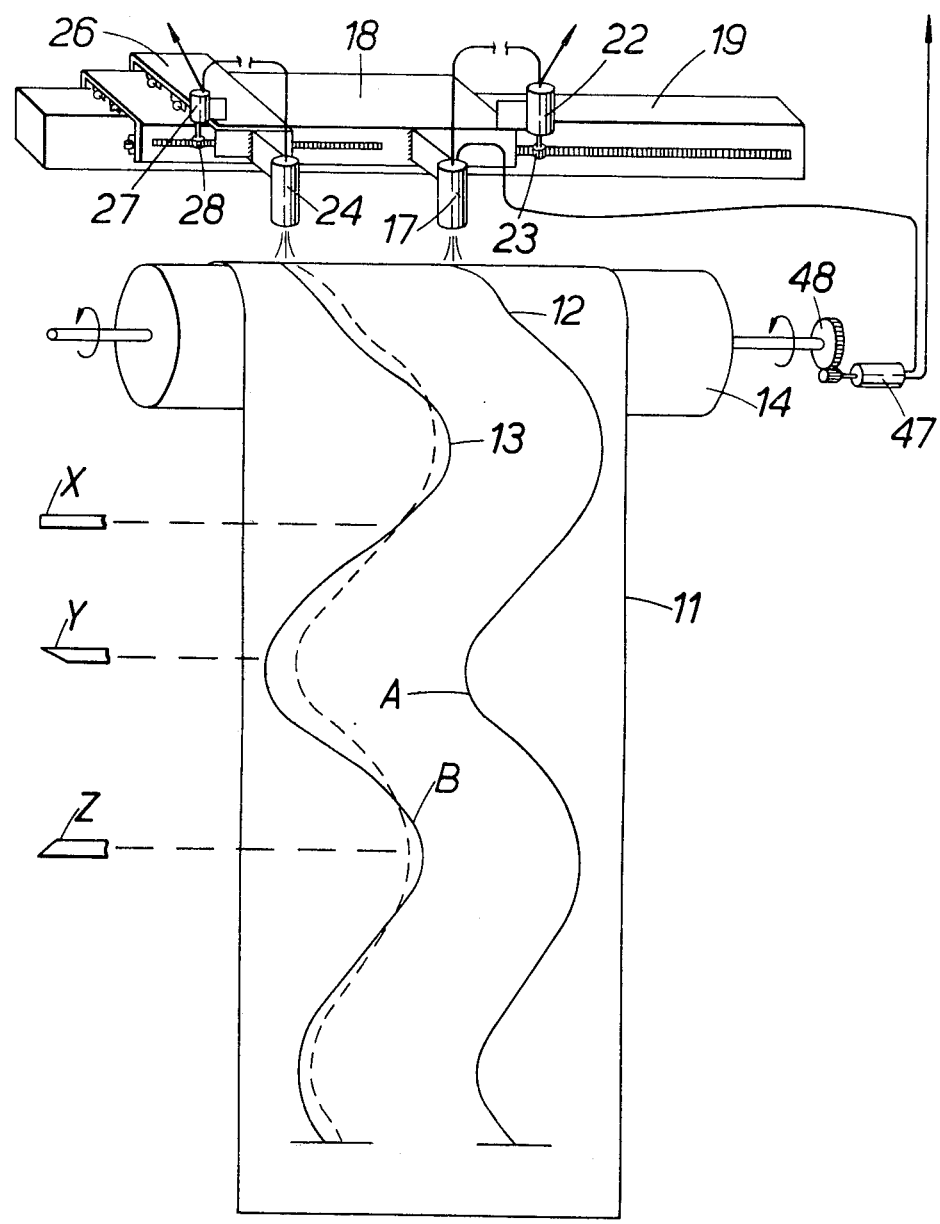

A specific embodiment of the invention will now be described by way of example with reference to the accompanying drawings in which:

FIG. 1 is a perspective view of a node showing the attachment of several branch tubes secured to a main tube by welding, FIG. 2 shows the intersection of one branch tube and the main tube, and a development of the profile at the intersection, FIG. 3 shows fragmentary section of parts of the intersection, FIG. 4 illustrates the scanning action, and FIG. 5 is a diagram of one form of profiling machine according to the invention.

A node for a jacket (intended to be part of an oil production platform) is illustrated in FIG. 1, in which item 9 represents a main tubular, and the three items 10 are branches.

FIGS. 2a and 2b illustrate how two lines are derived to form the representation of a programme to control a cutting device. The lines are intended to represent the correct contour, and also the correct angle for a cutting device at any point on the intersection. In welding a branch to a maintubular a constant angle $\theta$ should be maintained at every point. This could typically be 50°. If the branch 10 was to be laid out flat, the outside and inside contours of the cut could be drawn out as illustrated in FIG. 2b. The profile of the outside edge is here designated as line A. The distance between the two lines will vary around the branch (distance L) and the angle of inclination of the cutting device can be determined with reference to L if the thickness T of the branch is known. For reference the profile of the inside edge of the branch (in contact with the main tube) is here designated B.

If the angle at which the end of the branch tube is to be cut is designated $\alpha$ then $\tan \alpha$ equals L/T, and $\alpha$ equals $\tan^{-1}$ L/T.

From this formula the two scan lines A and B can be spaced apart at any point on the circumference of the branch tube, so that the cutting device will make an angle of $\theta$ to the branch wall.

It will be understood that the lines A and B are related to a common datum representing the time function.

FIG. 3 shows a fragmentary section along the line PQ in FIG. 1, and illustrates the angles $\theta$ and $\alpha$ in the plane of a weld.

The appropriate line of cut at different peripheral positions on the tubular are shown as X, Y, and Z respectively.

As mentioned above, the required profile and the bevel angle to be cut can be determined mathematically, and by utilising a computer unit linked to an incremental plotter unit, the necessary calculations can be carried out quickly and accurately and a line programme printed out. The mechanical interpretation of the two lines is then achieved by the utilization of scanning devices and servomotors as described below.

Referring particularly to FIGS. 4 and 5 a support 11 for profile (A), and bevel (B) scan lines 12 and 13, respectively, is carried by a scanning drum 14 linked to a servo-motor driving rotators 16 for a tubular component 15 to be profiled, the drum 14 and rotators 16 being driven timed relationship under the control of the scan line 12 over which is arranged a scanning eye 17 mounted on a carriage 18 mounted for linear movement on a support beam 19 forming part of the general framework of the machine. The carriage 18 also supports a servo-motor 22 connected by rack and pinion gearing 23 to the beam 19.

Arranged over the scan line 13 is a further scanning eye 24 mounted on a carriage 26 mounted for linear movement on the carriage 18. The carriage 26 also supports a servo-motor 27 connected by rack and pinion gearing 28 to the carriage 18. It will thus be seen that the two eyes 17 and 24 can be moved simultaneously by the motor 22 while the eye 24 can be moved relatively to the eye 17 by the motor 27 so to follow the lines A and B respectively.

At the profiling position (FIG. 5) referred to generally by reference numeral 29, a torch assembly 31 is mounted on a torch carriage 32 mounted for linear movement on a main carriage 33 itself mounted for linear movement on a main support beam 34. The carriage 32 also carries a servo-motor 36 connected by rack and pinion gearing 37 to the main carriage 33.

A cutting torch generally indicated by reference numeral 38 is pivotally mounted on the torch assembly 31 for movement about a vertical axis perpendicular to the horizontal cutting axis of the torch 38 and passing through the cutting point of the torch. The torch assembly 31 also carries a servo-motor 39 connected by segment and pinion gearing 41 to the pivotal mounting of the torch 38.

To compensate for any possible axial creep of the tubular component 15 there is on the tube, at a position remote from the profiling position 29, a circumferential scan line 42 arranged to be followed by a creep scanning eye 43 mounted on the main carriage 33 which also carries a further servo-motor 44 responsive to the eye 43 and connected to the main support beam 34 by rack and pinion gearing 46.

The motor 22, controlled by the profile eye 17 is connected by a feedback to the motor 36, the eye 17 also controlling a servo-motor 47 (FIG. 4) connected by gearing 48 to the drum 14, the motor 47 having a feedback to the servo-motor of the rotators 16. The motor 27 controlled by the bevel eye 24 is connected by a feed back to the motor 39.

In operation, it will be seen that the eyes 17 and 24 operate independently and simultaneously on the scan lines 12 and 13 to control the lateral movements of the carriage 18 to produce the scanning action and also to control the lateral movements of the carriage 32 and the pivotal movements of the torch 38 to produce the profiling and bevelling operations simultaneously.

Similarly, the entire profiling assembly is movable as one laterally under the control of the creep scanning eye and the motor 44 so to compensate automatically for any axial creep of the tube 15.

In order to accomodate tubulars (15) of different diameters the torch assembly 31 and the creep scanning eye 43 are vertically moveable on guides 48 and 49 by hand wheels 51 and 52 respectively. To the same end the main support beam 34 is movable laterally towards or away from the rotators 16.

We claim:

1. A control arrangement for plate cutting apparatus capable of making a cut which curves in, and is angled with respect to, the local plane of a plate, which arrangement comprises a programme representation defining a curve and relating an angle to that curve, which representation comprises two lines related to a common datum, and a first sensor device operatively responsive to a representation of the curve and a second sensor device operatively responsive to a representation of the corresponding angle, said sensor devices being operatively connected to send signals respectively capable of controlling relative translational movement between the plate and a cutting device such that a constant relative speed is maintained therebetween, and angular movement between the line of cut and the local plane of the plate, in accordance with said programme representation.

2. A control arrangement as claimed in claim 1 in which the sensor devices are photo-electric cells, and the photo-electric cells have means to follow said lines by scanning action.

3. A control arrangement as claimed in claim 1 in combination with a plate cutting apparatus capable of making a cut which curves in and is angled with respect to the local plane of a plate.

4. A combination as claimed in claim 3 in which the sensor devices are operatively connected to servo motors which effect translational and rotational movement respectively of a cutting device relative to the plate and in which there is means to move the plate itself in conjunction with the programme.

5. A combination as claimed in claim 3 in which a further sensor device has means to monitor translational creep of the plate, and there is means to move the cutting apparatus accordingly.

6. A combination as claimed in claim 5 in which the further sensor device is a photo-electric cell, and is operatively connected to actuate a further servo motor as it scans a reference marking on the plate.

7. A combination as claimed in claim 3 in which the plate is formed into a tubular, and is mounted on rollers having their axes arranged parallel with the tubular.

8. A combination as claimed in claim 7 in which there is means to move the rollers and the plate cutting apparatus relatively to each other to accomodate tubulars of different sizes.

9. A control arrangement as claimed in claim 1 in which the representation of the angle to the curve is a measure of the distance between the two lines.

10. A method of controlling plate cutting apparatus capable of making a cut which curves in, and is angled with respect to, the local plane of a plate, which comprises the steps of taking a programme representation defining a curve and relating an angle to that curve, which representation comprises two lines related to a common datum, deriving signals from a first sensor device operatively responsive to a representation of the curve and a second sensor device operatively responsive to a representation of the corresponding angle, and using those signals respectively to control relative translational movement between the plate and a cutting device such that a constant relative speed is maintained therebetween and angular movement between the line is cut and the local plane of the plate, in accordance with said programme representation.

11. A plate cutting apparatus having in combination:
   a. a cutting device capable of making a cut which curves in and is angled with respect to the local plane of a plate formed into a tubular,
   b. roller mounting means to support a tubular for rotation about a generally horizontal axis
   c. means to adjust the relative positions of (a) and (b) to accomodate tubulars of different diameters.
   d. a programme representation comprising two lines drawn predetermined distances from a common datum, which representation is mounted for rotation on a drum rotatable at the same angular velocity as the tubular.
   e. two photo electric cells motivated to follow the two lines aforesaid by scanning action.
   f. operative connections from (e) to servo motors which control relative movement between (a) and (b) such that the cut is made in accordance with the programme, and
   g. a further photo electric cell operatively connected to further a servo motor, and motivated to follow a reference line drawn round the tubular perpendicular to the generally horizontal axis, whereby the further servo motor can correct for translational creep of the tubular.

* * * * *